United States Patent
Sarmast et al.

(10) Patent No.: US 9,491,441 B2
(45) Date of Patent: Nov. 8, 2016

(54) METHOD TO EXTEND LASER DEPTH MAP RANGE

(75) Inventors: Sam M. Sarmast, Redmond, WA (US); Donald L. Doolittle, Woodinville, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1023 days.

(21) Appl. No.: 13/221,066

(22) Filed: Aug. 30, 2011

(65) Prior Publication Data

US 2013/0050426 A1 Feb. 28, 2013

(51) Int. Cl.
*H04N 13/00* (2006.01)
*H04N 13/02* (2006.01)
(Continued)

(52) U.S. Cl.
CPC ......... *H04N 13/0271* (2013.01); *G01S 7/4863* (2013.01); *G01S 17/89* (2013.01); *G06F 3/005* (2013.01); *G06F 3/011* (2013.01); *G06F 3/0304* (2013.01); *G06T 7/0057* (2013.01); *H04N 5/2351* (2013.01); *H04N 5/2353* (2013.01); *H04N 13/0025* (2013.01); *H04N 13/025* (2013.01); *H04N 13/0253* (2013.01); *G06T 2207/10016* (2013.01); *G06T 2207/10024* (2013.01); *G06T 2207/20208* (2013.01); *G06T 2207/30196* (2013.01)

(58) Field of Classification Search
CPC .................................................. H04N 13/0271
USPC ...................................................... 348/42–60
See application file for complete search history.

(56) References Cited

U.S. PATENT DOCUMENTS 5,781,807 A * 7/1998 Glassgold .............. G03B 17/12
                                                                348/371
6,503,195 B1 * 1/2003 Keller ................. A61B 1/00163
                                                                348/45
(Continued)

FOREIGN PATENT DOCUMENTS

CN        101090457 A     12/2007

OTHER PUBLICATIONS

Guo, "A High Dynamic Range CMOS Image Sensor for Scientific Imaging Applications," IEEE Sensors Journal, vol. 9, No. 10—Published Date: Oct. 2009, http://ieeexplore.ieee.org/stamp/stamp.jsp?arnumber=05226787.
(Continued)

*Primary Examiner* — Christopher S Kelley
*Assistant Examiner* — Shanika Brumfield
(74) *Attorney, Agent, or Firm* — Gregg Wisdom; Judy Yee; Micky Minhas

(57) ABSTRACT

A method for extending the dynamic range of a depth map by deriving depth information from a synthesized image of a plurality of images captured at different light intensity levels and/or captured over different sensor integration times is described. In some embodiments, an initial image of an environment is captured while the environment is illuminated with light of a first light intensity. One or more subsequent images are subsequently captured while the environment is illuminated with light of one or more different light intensities. The one or more different light intensities may be dynamically configured based on a degree of pixel saturation associated with previously captured images. The initial image and the one or more subsequent images may be synthesized into a synthesized image by applying high dynamic range imaging techniques.

20 Claims, 13 Drawing Sheets

(51) Int. Cl.
  *G01S 17/89* (2006.01)
  *G01S 7/486* (2006.01)
  *H04N 5/235* (2006.01)
  *G06T 7/00* (2006.01)
  *G06F 3/00* (2006.01)
  *G06F 3/01* (2006.01)
  *G06F 3/03* (2006.01)

(56) References Cited

U.S. PATENT DOCUMENTS

| | | | | |
|---|---|---|---|---|
| 6,587,183 | B1* | 7/2003 | Morimura | G01B 11/25 348/E5.058 |
| 6,678,351 | B1 | 1/2004 | Perry | |
| 6,753,876 | B2* | 6/2004 | Brooksby | G01B 11/25 345/440 |
| 7,440,590 | B1 | 10/2008 | Hassebrook | |
| 7,588,190 | B2 | 9/2009 | Zhu | |
| 7,643,035 | B2 | 1/2010 | Toyama | |
| 7,684,450 | B2 | 3/2010 | Shah | |
| 2007/0292048 | A1* | 12/2007 | Choe | H04N 5/23232 382/286 |
| 2010/0096461 | A1 | 4/2010 | Kotlarsky | |
| 2010/0128109 | A1 | 5/2010 | Banks | |
| 2010/0290698 | A1* | 11/2010 | Freedman | G06T 7/0057 382/154 |
| 2010/0328454 | A1* | 12/2010 | Yamada | G06T 7/0057 348/135 |
| 2011/0134114 | A1* | 6/2011 | Rais | H04N 13/0253 345/419 |

OTHER PUBLICATIONS

Kuang, "Evaluating HDR Rendering Algorithms," Munsell Color Science Laboratory, Rochester Institute of Technology, Rochester, New York, 2006, http://citeseerx.ist.psu.edu/viewdoc/download?doi=10.1.1.66.6146&rep=rep1&type=pdf.
European Search Report dated Jul. 29, 2014, European Patent Application No. 12828788.5.
European Examination Report dated Sep. 8, 2014, European Patent Application No. 12828788.5.
Response to European Office Action dated Oct. 30, 2014, European Patent Application No. 12828788.5.
Chinese Office Action dated May 4, 2015, Chinese Patent Application No. 201280041944.2.
Response to Chinese Office Action dated Aug. 10, 2015, Chinese Patent Application No. 201280041944.2.
Amendment dated Aug. 31, 2015, Japanese Patent Application No. 2014-528535.
Chinese Office Action dated Dec. 11, 2015, Chinese Patent Application No. 201280041944.2.
Office Action and Search Report Issued in Chinese Patent Application No. 201280041944.2, Mailed Date: May 16, 2016, 13 Pages.
Response to Office Action filed Jun. 30, 2016, English Summary of the Arguments and amended Claims, Chinese Patent Application No. 201280041944.2.
Fourth Office Action Issued in Chinese Patent Application No. 201280041944.2, Mailed Date: Aug. 1, 2016, 9 Pages.
Office Action Issued in Japanese Patent Application No. 2014-528535, Mailed Date: Jul. 12, 2016, 9 Pages.

* cited by examiner

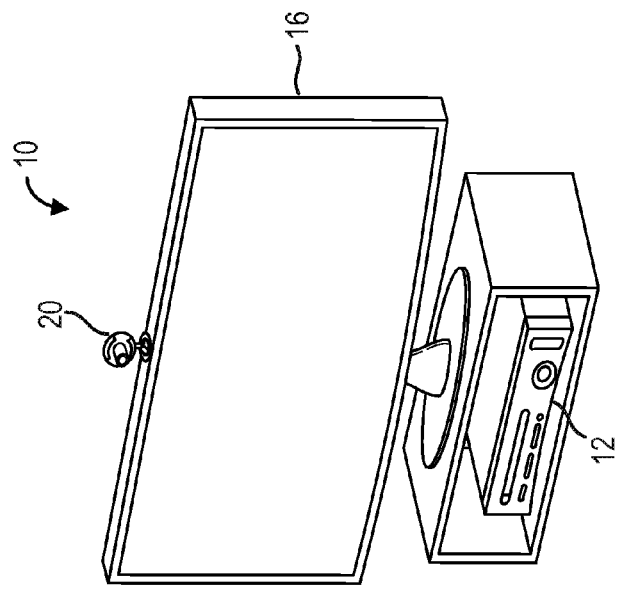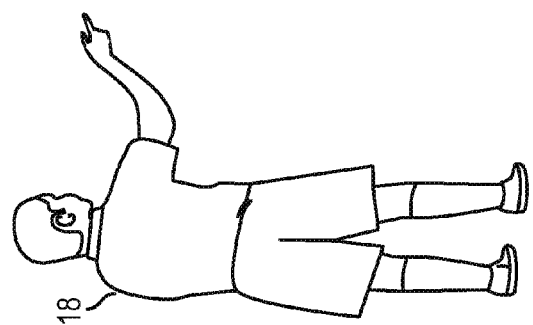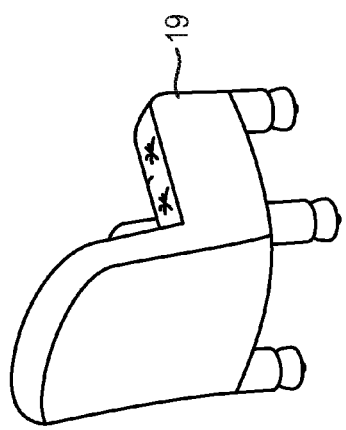
FIG. 2

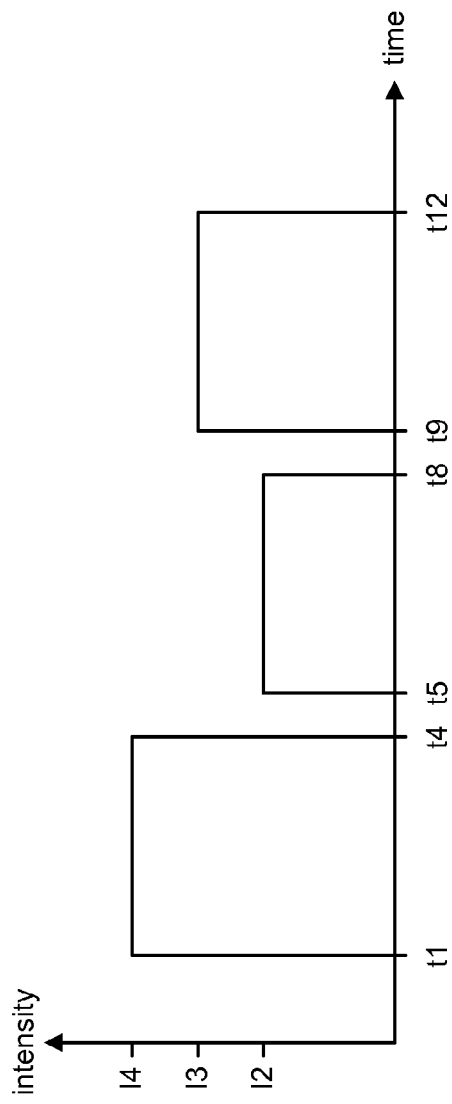
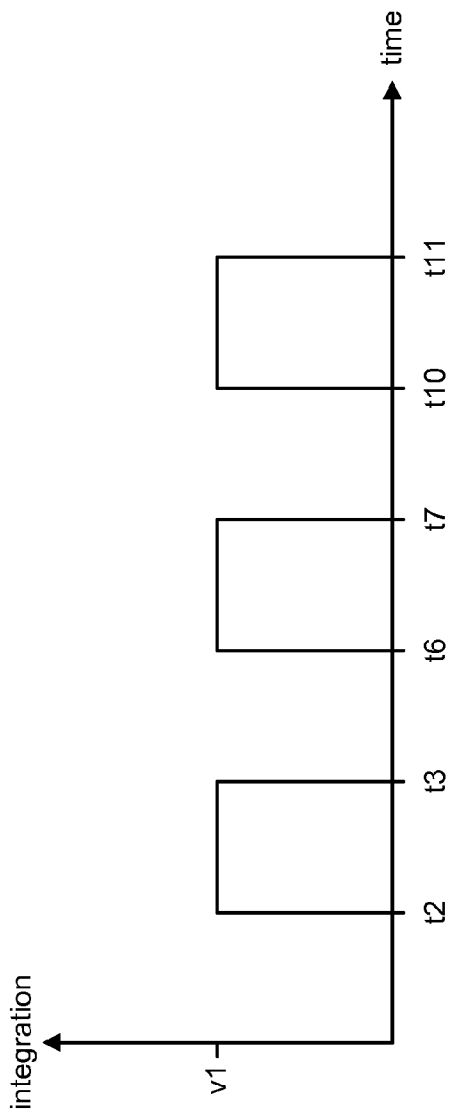

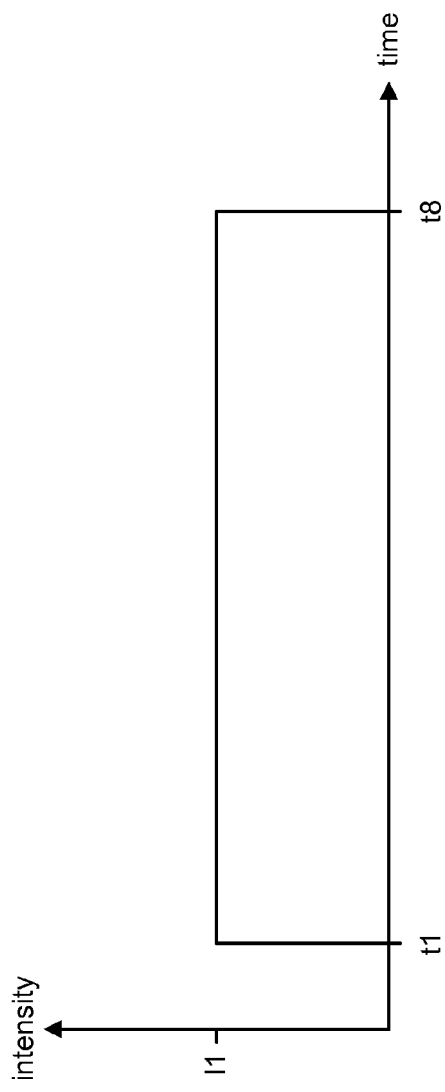
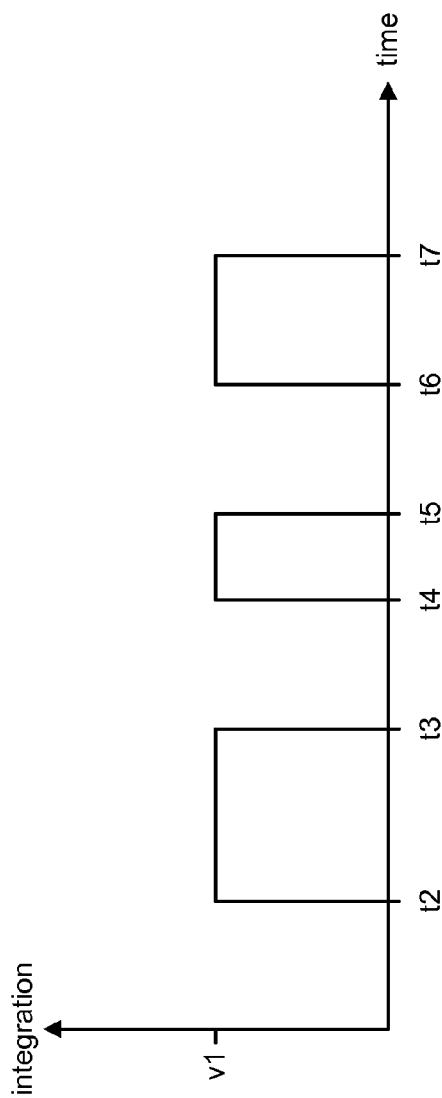

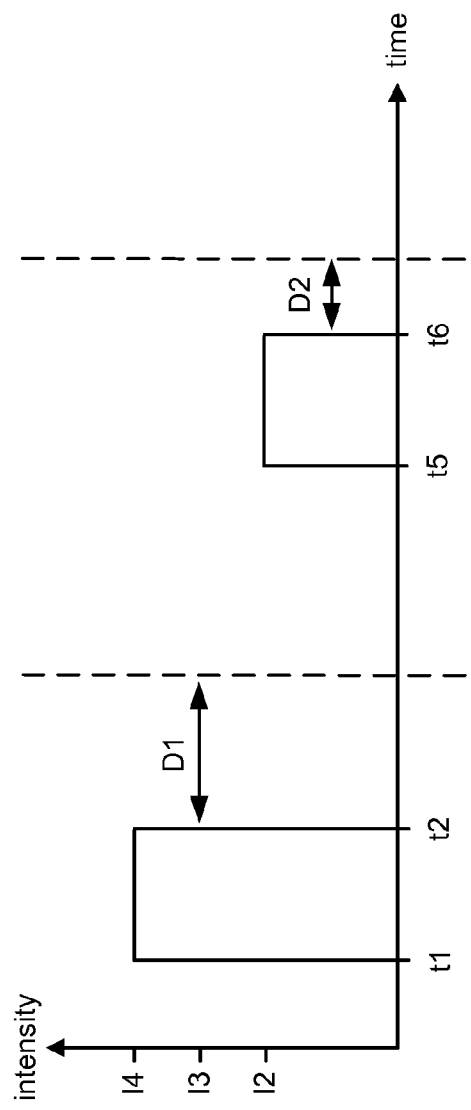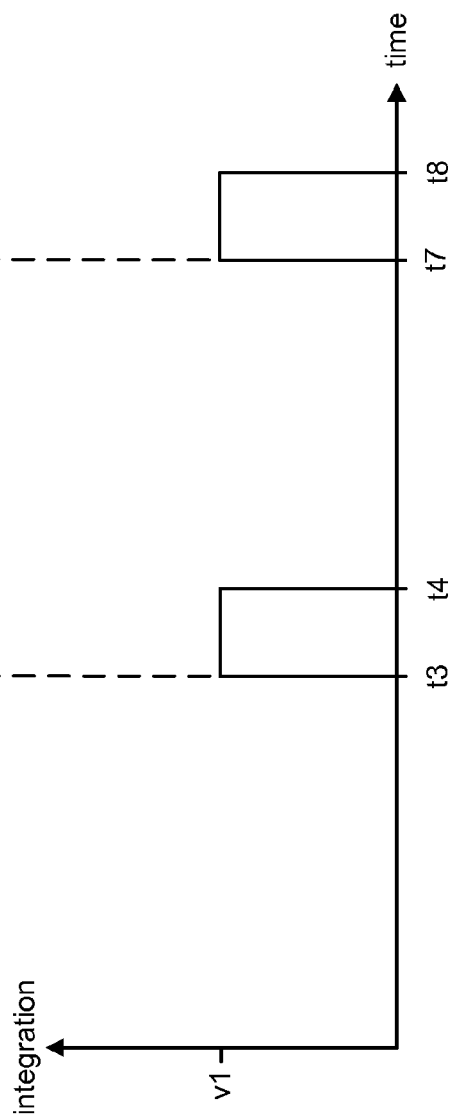

METHOD TO EXTEND LASER DEPTH MAP RANGE

BACKGROUND

A depth map typically comprises a two-dimensional image of an environment that includes depth information relating to the distances to objects within the environment from a particular reference point. The particular reference point may be associated with an image capture device. Each pixel in the two-dimensional image may be associated with a depth value representing a linear distance from the particular reference point. A variety of techniques may be used to generate a depth map such as structured light illumination and time of flight techniques.

Structured light illumination involves projecting a light pattern into an environment, capturing an image of the reflected light pattern, and then determining distance information from the spacings and/or distortions associated with the reflected light pattern relative to the projected light pattern. The light pattern may be projected using light that is invisible to the naked eye (e.g., IR or UV light) and may comprise a single dot, a single line, or a variety of dimensional patterns (e.g., horizontal and vertical lines, or checkerboard patterns). In some cases, several different light patterns may be necessary to generate accurate depth information.

Time of flight techniques may determine distances to objects within an environment by timing how long it takes for light transmitted from a light source to travel to the objects and reflect back to an image sensor. In some cases, a short light pulse (or series of light pulses) may be projected into the environment at a first point in time and reflections associated with the short light pulse may be captured at a second point in time after the first point in time. A time of flight system may adjust the time difference between the first point in time and the second point in time in order to detect objects at a particular distance (or over a range of distances) associated with the time difference.

SUMMARY

Technology is described for extending the dynamic range of a depth map by deriving depth information from a synthesized image of a plurality of images captured at different light intensity levels and/or captured over different sensor integration times. In some embodiments, an initial image of an environment is captured while the environment is illuminated with light of a first light intensity. One or more subsequent images are subsequently captured while the environment is illuminated with light of one or more different light intensities. The one or more different light intensities may be dynamically configured based on a degree of pixel saturation associated with previously captured images. The initial image and the one or more subsequent images may be synthesized into a synthesized image by applying high dynamic range imaging techniques.

One embodiment includes projecting a light pattern into a first environment using a first light intensity level, capturing a first image of the first environment over a first sensor integration time, determining a degree of pixel saturation associated with the first image, and setting a second light intensity level based on the degree of pixel saturation. The method further includes projecting the light pattern into the first environment using the second light intensity level, capturing a second image of the first environment, synthesizing the first image and the second image into a combined image, and outputting a depth map based on the combined image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 depicts one embodiment of a target detection and tracking system and an environment within a field of view of a capture device.

FIG. 4A depicts one embodiment of a series of light pulses projected into an environment over time.

FIG. 4B depicts one embodiment of a series of sensor integration times over the same period of time as that depicted in FIG. 4A.

FIG. 5A depicts one embodiment of a light pulse of a first light intensity being projected into an environment.

FIG. 5B depicts one embodiment of a series of sensor integration times over the same period of time as that depicted in FIG. 5A.

FIG. 6C depicts one embodiment of a series of light pulses projected into an environment over time.

FIG. 6D depicts one embodiment of a series of sensor integration times over the same period of time as that depicted in FIG. 6C.

DETAILED DESCRIPTION

Figure 1:
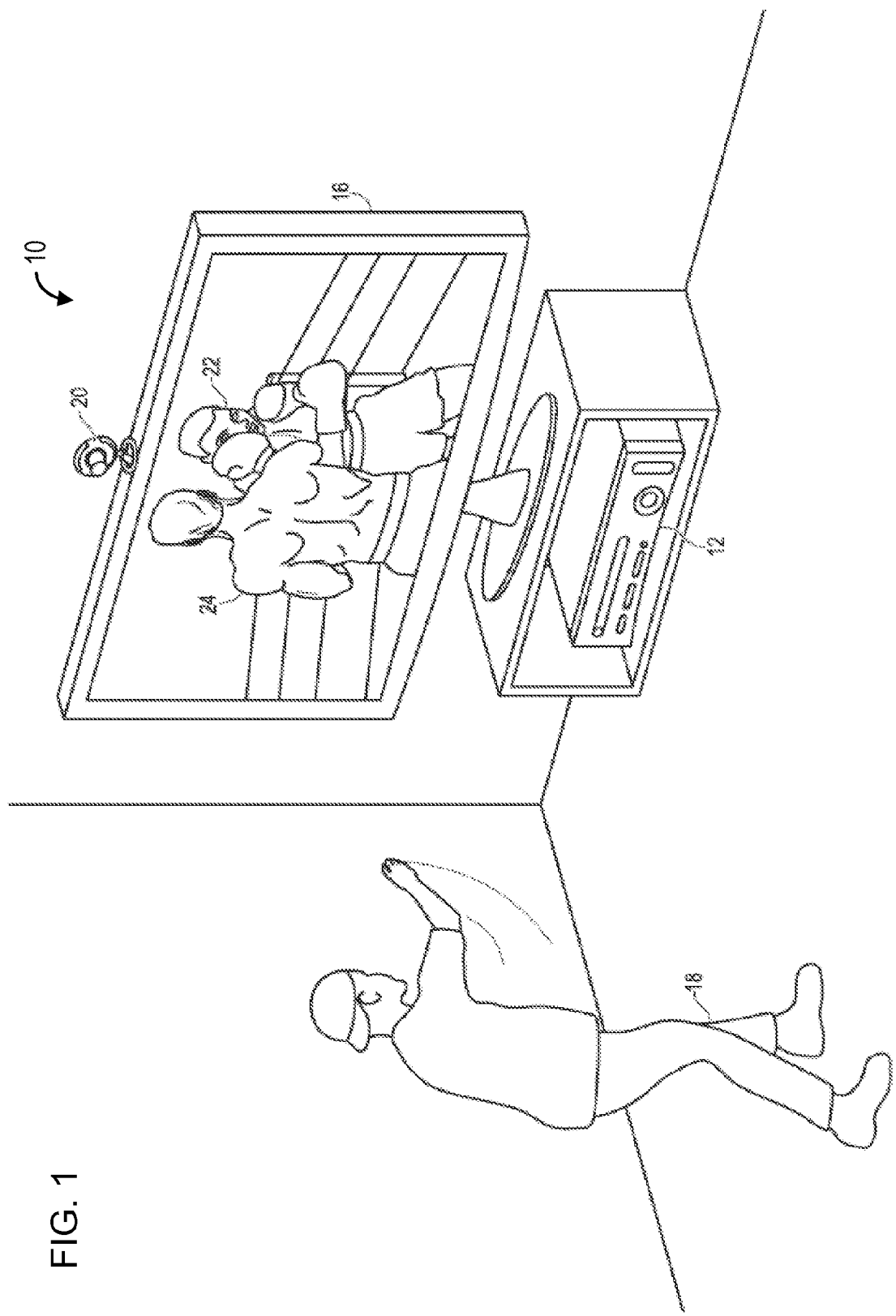
FIG. 1 depicts one embodiment of a target detection and tracking system with a user playing a boxing game.

Technology is described for extending the dynamic range of a depth map by deriving depth information from a synthesized image of a plurality of images captured at different light intensity levels and/or captured over different sensor integration times. In some embodiments, an initial image of an environment is captured while the environment is illuminated with light of a first light intensity. One or more subsequent images are subsequently captured while the environment is illuminated with light of one or more different light intensities. The one or more different light intensities may be dynamically configured based on a degree of pixel saturation associated with previously captured images. The initial image and the one or more subsequent images may be synthesized into a synthesized image by applying high dynamic range imaging techniques.

A depth map may be generated using a depth detection system that includes a light source for projecting a particular light pattern and a light sensor device for capturing one or more images associated with reflections of the particular light pattern. The accuracy and dynamic range of a depth map may be compromised when an environment (e.g., a play space) associated with the depth map includes both objects that are close to and far away from the light sensor device (e.g., a camera system or image sensor) from which the depth map is generated. For the light sensor device to see far away objects, a greater light intensity (e.g., via greater optical laser power) may be required to "light-up" the far away objects so that the light sensor device can detect reflected light from the far away objects. However, use of a greater light intensity by the depth detection system may cause the objects which are close in proximity to the light sensor device to become saturated or washed-out, and thus make it difficult to discern any meaningful depth information. Therefore, if the projected light intensity is set in order to illuminate far away objects, then the closer an object is to the light sensor device, the more saturated the image of the object may become. At some point, differences in depth may not be distinguishable due to pixel saturation.

Moreover, objects with reflective, semi-transparent, or transparent surfaces may raise difficulties for a depth detection system. For example, if an object's surface is highly reflective, then light may be reflected away from the light sensor device or focused directly towards the light sensor device. If an object's surface is highly transparent, then sufficient light may not be reflected back towards the light sensor device. Therefore, in addition to an object's varying distance from a light sensor device, the object's surface properties may also lead to significant differences in the reflected light captured by the light sensor device.

For purposes of this document, the term "light" may refer to any sort of optical radiation including visible light, infrared light, and ultraviolet light.

FIG. 1 depicts one embodiment of a target detection and tracking system 10 with a user 18 playing a boxing game. The target detection and tracking system 10 may be used to detect, recognize, analyze, and/or track human targets, such as user 18, and/or non-human targets, such as a prop held by user 18 (not shown). Target detection and tracking system 10 may include a depth detection system for generating a depth map of the place space environment in which user 18 exists.

As shown in FIG. 1, the target detection and tracking system 10 may include a computing environment 12. The computing environment 12 may include a computer, a gaming system or console, or the like. In one embodiment, the computing environment 12 may include hardware components and/or software components such that the computing environment 12 may be used to execute an operating system and applications such as gaming applications, non-gaming applications, or the like. In one embodiment, computing system 12 may include a processor such as a standardized processor, a specialized processor, a microprocessor, or the like that may execute instructions stored on a processor readable storage device for performing the processes described herein.

The target detection and tracking system 10 may further include a capture device 20. In one embodiment, capture device 20 may include a camera that may be used to visually monitor one or more targets including one or more users, such as the user 18. Gestures (including poses) performed by the one or more users may be captured, analyzed, and tracked to perform one or more controls or actions for the user-interface of an operating system or application. In some embodiments, the capture device 20 may include a depth sensing camera.

Through moving his or her body, a user may create gestures. A gesture may comprise a motion or pose by the user that may be captured as image data and parsed for meaning. A gesture may be dynamic, comprising a motion, such as mimicking throwing a ball. A gesture may be a static pose, such as holding one's forearms crossed. A gesture may also incorporate props, such as swinging a mock sword.

Capture device 20 may capture image and audio data relating to one or more users and/or objects. For example, capture device 20 may be used to capture information relating to partial or full body movements, gestures, and speech of one or more users. The information captured by capture device 20 may be received by computing environment 12 and/or a processing element within capture device 20 and used to render, interact with, and control aspects of a gaming or other application. In one example, capture device 20 captures image and audio data relating to a particular user and computing environment 12 processes the captured information to identify the particular user by executing facial and voice recognition software.

In some embodiments, target detection and tracking system 10 may generate and utilize a depth map for detecting and/or tracking objects in an environment. The depth map may comprise an image or frame of an environment that includes depth information associated with the environment. In one example, the depth image may include a plurality of observed pixels where each observed pixel has an associated depth value. For example, each pixel may include a depth value such as a length or distance to an object in the environment from the point of view of the capture device.

The target detection and tracking system 10 may be connected to an audiovisual device 16 such as a television, a monitor, or a high-definition television (HDTV) for providing game or application visuals and/or audio to a user such as user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may output the game or application visuals and/or audio associated with the audiovisual signals to the user 18. The audiovisual device 16 may be connected to the computing environment 12 via, for example, an S-Video cable, a coaxial cable, an HDMI cable, a DVI cable, a VGA cable, or the like.

As shown in FIG. 1, the application executing on the computing environment 12 may be a boxing game that the user 18 may be playing. The computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, the user 18 may throw a punch in physical space to cause the player avatar 24 to throw a punch in game space. In one embodiment, the computer environment 12 and the capture device 20 of the target detection and tracking system 10 may be used to recognize and analyze the punch of the user 18 in physical space such that the punch may be interpreted as a game control of the player avatar 24 in game space.

In one embodiment, a user's movements may be interpreted as controls that may correspond to actions other than controlling the player avatar 24. For example, the user 18 may use particular movements to end a game, pause a game, save a game, select a level, view high scores, or communicate with a friend. In another embodiment, target detection and tracking system 10 interprets a target's movements as operating system and/or application controls that are outside the realm of games. For example, virtually any controllable aspect of an operating system and/or application may be controlled by movements of the target such as the user 18. In another embodiment, the user 18 may use movements to select the game or other application from a main user interface. A full range of motion of the user 18 may be available, used, and analyzed in any suitable manner to interact with an application or operating system.

Suitable examples of a target detection and tracking system 10 and components thereof are found in the following co-pending patent applications, all of which are herein incorporated by reference in their entirety: U.S. patent application Ser. No. 12/475,094, entitled "Environment And/Or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

FIG. 2 depicts one embodiment of a target detection and tracking system 10 and an environment 300 within a field of view of capture device 20. The environment 300 includes a human object (user 18) and a non-human object (chair 19). As depicted, user 18 is much closer to capture device 20 than chair 19. In one embodiment, target detection and tracking system 10 generates a depth map of the environment 300 by merging or synthesizing two or more different images of the environment. Each of the two or more different images may be captured when the environment 300 is illuminated with a light pattern associated with different light intensity levels. By synthesizing the two or more different images of the environment into a synthesized image, information associated with both near and far objects may be preserved. For example, generating depth information from the higher dynamic range synthesized image may provide for a more accurate determination of distances from the capture device 20 to user 18 and chair 19.

In one embodiment, a first light pulse of a first light intensity is projected into the environment 300 and captured by capture device 20. Subsequently, a second light pulse of a second light intensity is projected into the environment 300 and captured by capture device 20. The first light intensity may be of a lower light intensity than the second light intensity. In this case, the first light pulse associated with the lower light intensity may be used to capture depth information associated with user 18, while the second light pulse associated with the higher light intensity may be used to capture depth information associated with chair 19 (i.e., the higher light intensity is used to illuminate objects at a farther distance than the lower light intensity).

The target detection and tracking system 10 may modify either the intensity of the light being projected into an environment (e.g., by increasing or decreasing the amount of current or power supplied to the light source) or the exposure time of the capture device (e.g., by increasing or decreasing the light sensor integration time) in order to produce images associated with varying degrees of light intensity. In some embodiments, a predetermined number of light pulses of varying light intensities may be projected into the environment 300 and associated images of the environment with respect to each of the light pulses may be subsequently captured.

Prior to generating a depth map, the target detection and tracking system 10 may perform a calibration step in order to determine the maximum light intensity level necessary for a particular environment (e.g., by estimating the size of the room or play space in which a depth detection system exists). The target detection and tracking system 10 may also determine a maximum number of light pulses and/or a maximum number of capture steps based on power and performance requirements. For example, the maximum number of light pulses may be reduced if the target detection and tracking system 10 is in a low power mode. Thus, the maximum number of light pulses and/or the maximum number of capture steps may be adjusted over time as system requirements change.

Figure 3:
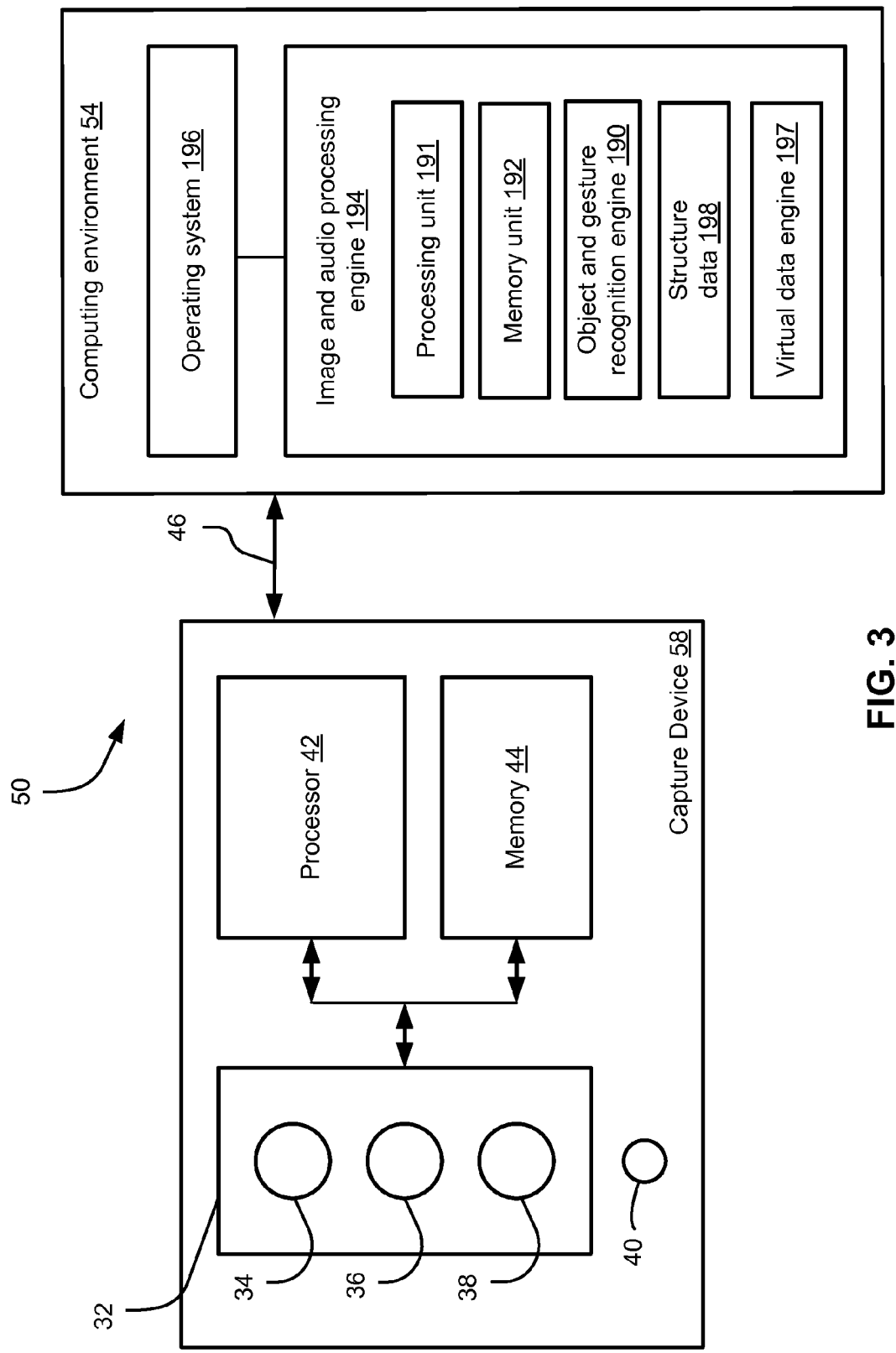
FIG. 3 illustrates one embodiment of a computing system including a capture device and a computing environment.

FIG. 3 illustrates one embodiment of a computing system 50 including a capture device 58 and computing environment 54. Computing system 50 is one example of an implementation for the target detection and tracking system 10 of FIGS. 1-2. For example, computing environment 54 may correspond with computing environment 12 in FIGS. 1-2 and capture device 58 may correspond with capture device 20 in FIGS. 1-2.

In one embodiment, the capture device 58 may include one or more image sensors for capturing images and videos. An image sensor may comprise a CCD image sensor or a CMOS sensor. In some embodiments, capture device 58 may include an IR CMOS image sensor. The capture device 58 may also include a depth camera (or depth sensing camera) configured to capture video with depth information including a depth image that may include depth values via any suitable technique including, for example, time-of-flight, structured light, stereo image, or the like.

The capture device 58 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 58 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 58 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 58 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 58 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 58 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As shown in FIG. 3, capture device 58 may include a microphone 40. The microphone 40 may include a transducer or sensor that may receive and convert sound into an electrical signal.

The capture device 58 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 58.

The capture device 58 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As shown in FIG. 4, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 58 illustrated in FIG. 4 are housed in a single housing.

The capture device 58 may be in communication with the computing environment 54 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 54 may provide a clock to the capture device 58 that may be used to determine when to capture, for example, a scene via the communication link 46. In one embodiment, the capture device 58 may provide the images captured by, for example, the 3D camera 36 and/or the RGB camera 38 to the computing environment 54 via the communication link 46.

As shown in FIG. 3, computing environment 54 includes image and audio processing engine 194 in communication with operating system 196. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 58. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects, image and audio processing engine 194 may report to operating system 196 an identification of each object detected and a corresponding position and/or orientation.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing object recognition. In one example, object and gesture recognition engine 190 may include a collection of gesture filters, each comprising information concerning a gesture that may be performed by a skeletal model. The object and gesture recognition engine 190 may compare the data captured by capture device 58 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

FIG. 4A depicts one embodiment of a series of light pulses projected into an environment over time. As depicted, a first light pulse of light intensity I4 is projected into the environment between times t1 and t4, a second light pulse of light intensity I2 is projected into the environment between times t5 and t8, and a third light pulse of light intensity I3 is projected into the environment between times t9 and t12. In one embodiment, the first light pulse comprises an initial light pulse projected into the environment. The light intensity associated with the first light pulse may be set to a maximum light intensity associated with a particular light source or to a particular light intensity associated with a particular distance (or range) from a capture device, such as capture device 58 in FIG. 3.

FIG. 4B depicts one embodiment of a series of sensor integration times over the same period of time as that depicted in FIG. 4A. As depicted, the three sensor integration times corresponds with the three light pulses depicted in FIG. 4A. In some embodiments, a target detection and tracking system, such as target detection and tracking system 10 in FIGS. 1-2, may project a first light pulse beginning at time t1 and capture a first image associated with the first light pulse between times t2 and t3. The target detection and tracking system may then determine a degree of pixel saturation associated with the first image. Thereafter, the light intensities of subsequent light pulses may be dynamically adjusted depending on the degree of pixel saturation associated with previously captured images.

In one embodiment, the degree of pixel saturation is determined by determining a percentage of pixels that are saturated within the first image. If the first image has a degree of pixel saturation above a particular percentage threshold (e.g., more than 5% of the pixels are saturated), then the light intensity level associated with the next light pulse may be reduced. Determining a degree of pixel saturation associated with the first image may also include determining a number of pixels that have been assigned the highest possible light intensity setting (e.g., an 8-bit pixel value equal to 255) or determining the number of pixels that have been assigned a light intensity value above a particular threshold (e.g., all values above an 8-bit pixel value equal to 250).

As depicted, the second light pulse in FIG. 4A is projected with a light intensity (I2) that is half of the first light intensity (I4) beginning at time t5. Between times t6 and t7, the target detection and tracking system captures a second image associated with the second light pulse. Subsequently, a degree of pixel saturation associated with the second image is determined. If the degree of pixel saturation is below the particular threshold, then the light intensity level associated with a subsequent light pulse may be increased. The third light pulse is projected with a light intensity between the light intensities of the first light pulse and the second light pulse and a third image is captured between times t10 and t11.

FIG. 5A depicts one embodiment of a light pulse of light intensity I1 being projected into an environment between times t1 and t8. FIG. 5B depicts one embodiment of a series of sensor integration times over the same period of time as that depicted in FIG. 5A. As depicted, a first image is captured during a first sensor integration time between times t2 and t3. In some embodiments, a target detection and tracking system, such as target detection and tracking system 10 in FIGS. 1-2, may determine a degree of pixel saturation associated with the first image. If the first image is determined to have a degree of pixel saturation above a particular threshold (e.g., more than 5% of the pixels are saturated), then the sensor integration time associated with the subsequent capture time may be reduced. Thus, the sensor integration times may be dynamically adjusted depending on the degree of pixel saturation associated with previously captured images.

As depicted, a second image is captured during a second sensor integration time between times t4 and t5. Because the first image was determined to have a degree of pixel saturation above a particular threshold, the sensor integration time associated with the second sensor integration time is half that of the first sensor integration time. Subsequently, the target detection and tracking system may determine a degree of pixel saturation associated with the second image. If the degree of pixel saturation associated with the second image is below the particular threshold, then the sensor integration time associated with a subsequent capture time may be increased. As depicted, the third sensor integration time between times t6 and t7 is given an amount of integration time (or exposure time) between that of the first sensor integration time and the second sensor integration time.

In some embodiments, both the light intensity levels and/or the sensor integration times may be dynamically adjusted depending on the degree of pixel saturation associated with previously captured images. For example, both the light intensity levels and the sensor integration times may be reduced if the degree of pixel saturation associated with an image is above a particular threshold.

Moreover, the number of light pulses and/or the number of sensor integration times may be limited by how much processing power, memory, and time is available to the target detection and tracking system. The higher the number of images captured, the larger the amount of resources required to process and create a synthesized image. In many applications, the time required to generate depth information must be such that a video stream projected to an end user is not slower than 30 frames per second.

Figure 6A:
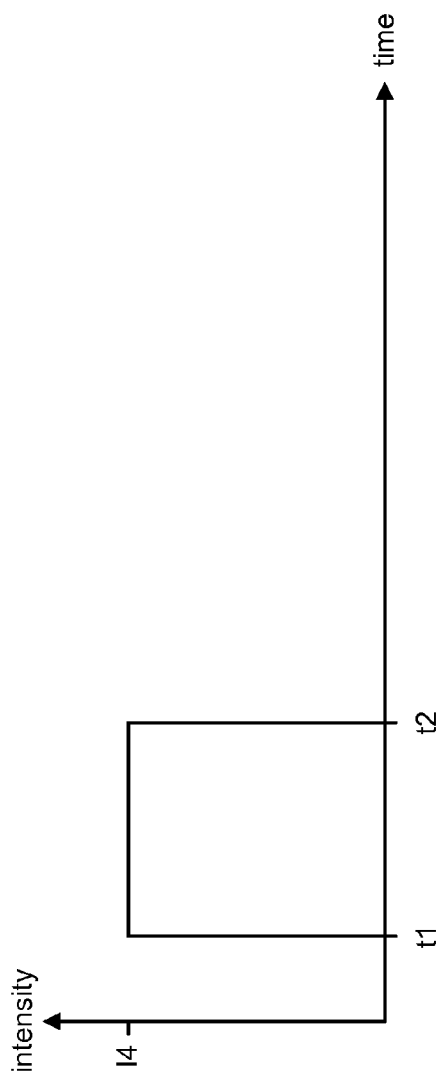
FIG. 6A depicts one embodiment of a light pulse of a first light intensity being projected into an environment.
Figure 6B:
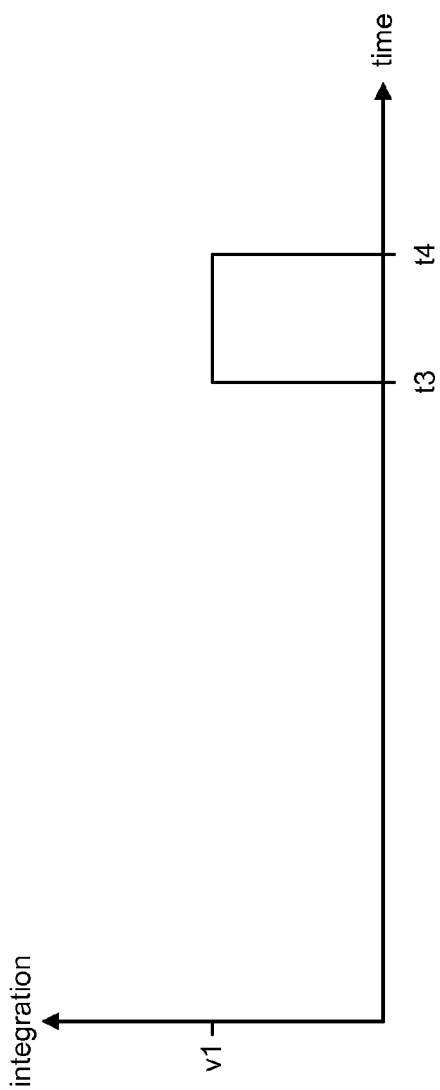
FIG. 6B depicts one embodiment of a sensor integration time.

FIG. 6A depicts one embodiment of a light pulse of light intensity I4 being projected into an environment between times t1 and t2. FIG. 6B depicts one embodiment of a sensor integration time between times t3 and t4. As the sensor integration time does not overlap with the light pulse, the image that is captured during the sensor integration time will depend on the time difference between the light pulse and the sensor integration time, and the objects within the environment at a distance that is associated with the time of flight delay of the light pulse reflecting back from those objects. For example, the time for light to travel to an object 15 meters away and reflect back to the capture device is roughly 100 ns (i.e., 15 meters*2/300,000,000 meters per second). The pulse width of the light pulse (e.g., from a laser light source) determines the resolution of the range over which objects may be viewed (i.e., the shorter the pulse width, the better the resolution in terms of distance). For example, for a 3 meter resolution a 10 ns pulse is required (i.e., 3 meters/300,000,000 meters per second). Furthermore, the sensor integration time may also reduce the resolution of the range as the projected light may be reflected and captured at any time within the sensor integration time (i.e., light captured at time t3 has most likely traveled a shorter distance than the light captured at time t4). In the worst case, light projected at time t2 will be captured at time t3 and light projected at time t1 will be captured at time t4. Thus, the time difference between a projected light pulse and a corresponding sensor integration time may be used to capture distance information associated with a particular range from the target detection and tracking system (e.g., a particular time difference may be used to capture objects between 10 meters and 20 meters from the target detection and tracking system).

In one embodiment, the time difference between a projected light pulse and a corresponding sensor integration time may be based on a particular distance (or range of distances) from a target detection and tracking system. For example, the time difference between times t2 and t3 in FIGS. 6A and 6B may be smaller when capturing distance information associated with distances closer to the target detection and tracking system as compared with when capturing distance information associated with distances farther away from the target detection and tracking system.

FIG. 6C depicts one embodiment of a series of light pulses projected into an environment over time. As depicted, a first light pulse of light intensity I4 is projected into an environment between times t1 and t2 and a second light pulse of light intensity I2 less than I4 is projected into the environment between times t5 and t6. FIG. 6D depicts one embodiment of a series of sensor integration times over the same period of time as that depicted in FIG. 6C. The first sensor integration time between times t3 and t4 corresponds with the first light pulse and may capture a first image of the environment. The second sensor integration time between times t7 and t8 corresponds with the second light pulse and may capture a second image of the environment. As depicted, a first time difference D1 between the projection of the first light pulse and the first sensor integration time is greater than a second time difference D2 between the second light pulse and the second integration time. In this case, the first image of the environment may include distance information associated with a first range of distances farther away from a target detection and tracking system than a second range of distances associated with the second image.

In one embodiment, both the light intensity of a light pulse and the time difference between the projection of the light pulse and a corresponding sensor integration time may be adjusted based on a capturing distance from a target detection and tracking system. Both the light intensity and the time difference may be reduced when the capturing distance is closer to the target detection and tracking system as compared with capturing distances farther away from the target detection and tracking system.

Figure 6E:
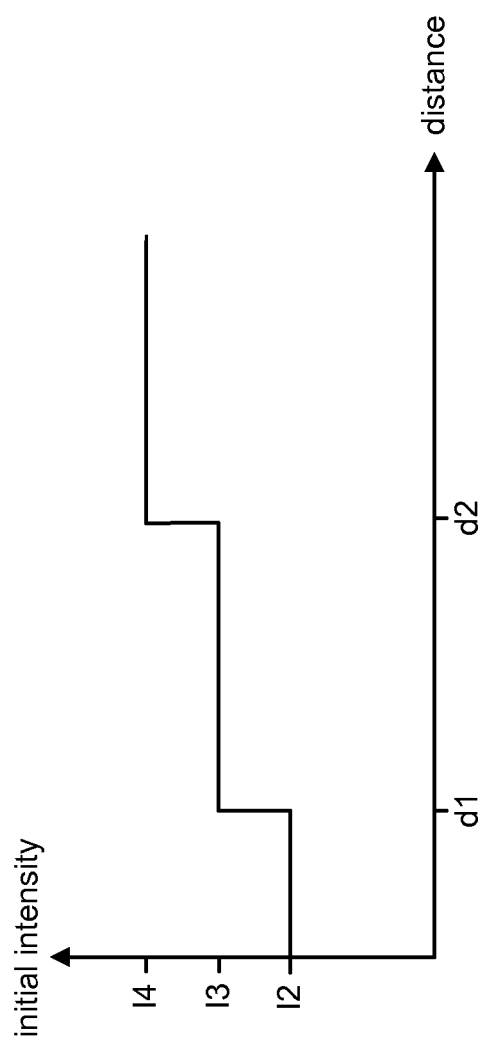
FIG. 6E depicts one embodiment of a function for determining an initial light intensity given a particular distance.

FIG. 6E depicts one embodiment of a function for determining an initial light intensity given a particular distance (or range of distances). As depicted, for a particular range associated with distances d1 and d2, an initial light intensity of I3 will be used for the first light pulse projected into an environment. For distances farther than d2, an initial light intensity of I4 will be used. Lookup tables and various linear or nonlinear functions may also be used. In some embodiments, the greater the distance, the higher the initial light intensity.

In one embodiment, a first time difference between a first light pulse and a first sensor integration time is used to determine distance information within a first range of distances from a target detection and tracking system (e.g., within the first 10 meters from the target detection and tracking system). To determine an initial light intensity for a projected light pattern, a lookup table of predetermined maximum light intensities depending on distance from the target detection and tracking system may be used. The target detection and tracking system may subsequently project a plurality of light pulses of varying light intensities, and capture a plurality of images associated with the plurality of light pulses all using the same first time difference. To determine distance information within a second range of distances from the target detection and tracking system (e.g., within 10 meters to 20 meters of the target detection and tracking system), a second time difference may be used. A higher initial light intensity may be used for the projected light pattern as the second range of distances is farther away than the first range of distances. Subsequently, a second plurality of light pulses of varying light intensities may be projected into the environment and a second plurality of images may be captured using the second time difference.

Figure 7A:
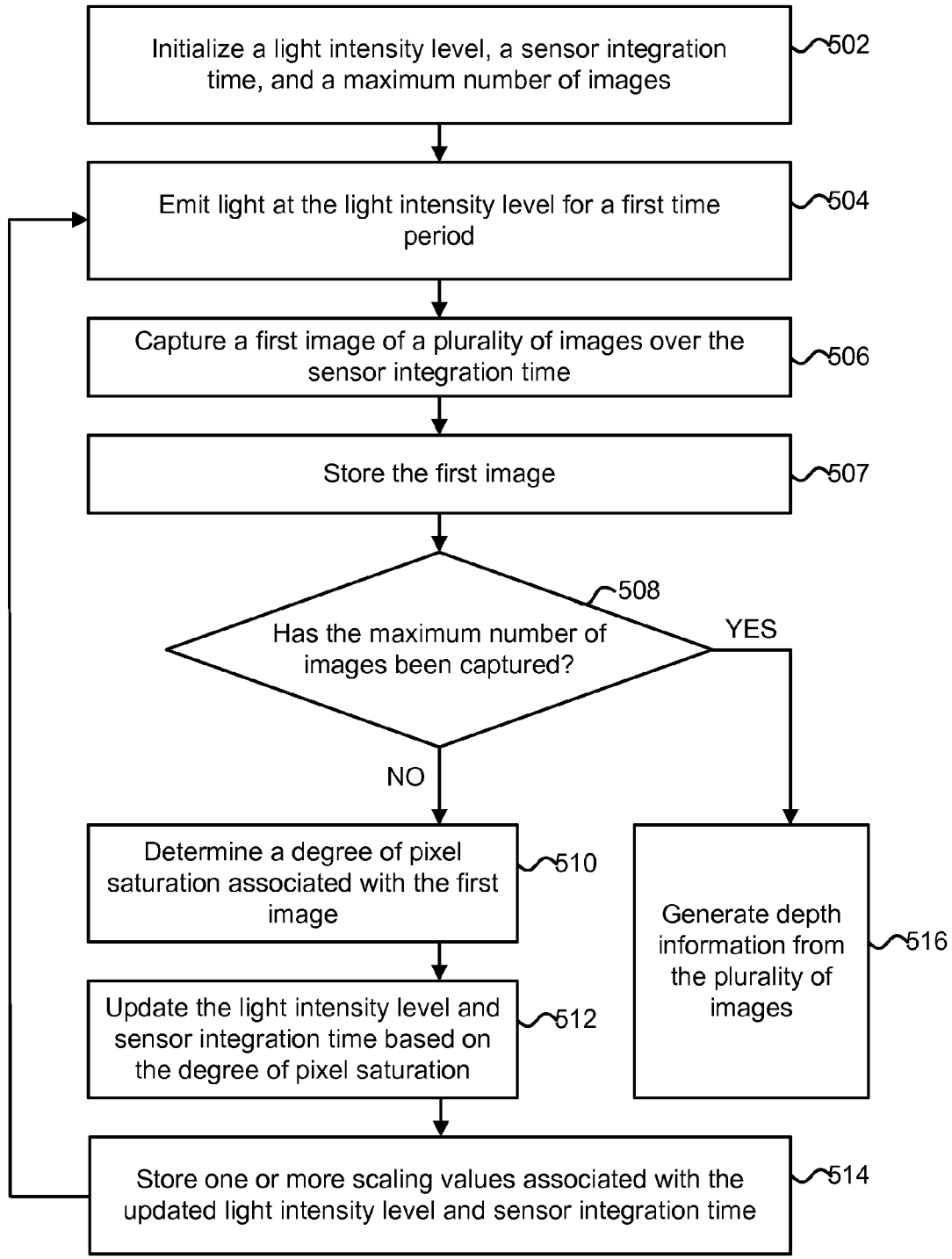
FIG. 7A is a flowchart describing one embodiment of a process for extending the dynamic range of a depth map.

FIG. 7A is a flowchart describing one embodiment of a process for extending the dynamic range of a depth map. The process of FIG. 7A may be performed continuously and by one or more computing devices. Each step in the process of FIG. 7A may be performed by the same or different computing devices as those used in other steps, and each step need not necessarily be performed by a single computing device. In one embodiment, the process of FIG. 7A is performed by a target detection and tracking system, such as target detection and tracking system 10 in FIGS. 1-2.

In step 502, settings for a light intensity level, a sensor integration time, and a maximum number of images are initialized. The initial light intensity level and sensor integration time may be based on a particular range from a target detection and tracking system. The maximum number of images may be a function of a desired video frame rate (e.g., 30 frames per second). In step 504, light at the light intensity level is emitted for a first time. The emitted light may comprise a structured pattern being projected into an environment. In step 506, a first image of a plurality of images is captured over the sensor integration time. In step 507, the first image is stored. In one example, the first image may be stored in a memory buffer.

In step 508, it is determined whether the maximum number of images has been captured. If it is determined that the maximum number of images has not been captured, then step 510 is performed. In step 510, a degree of pixel saturation associated with the first image is determined. The degree of pixel saturation may be a function of the number of pixels saturated within the first image. The degree of pixel saturation may be determined by threshold detection circuitry within an image sensor or by image processing software. In step 512, the light intensity level and sensor integration time are updated based on the degree of pixel saturation determined in step 510. In step 514, one or more scaling values associated with the updated light intensity level and sensor integration time are stored. In one example, the updated light intensity level is half that of the previous light intensity level, and therefore a scaling value of ½ will be stored. After step 514, step 504 is performed again using the updated light intensity level and sensor integration time.

If it is determined that the maximum number of images has been captured, then step 516 is performed. In step 516, depth information from the plurality of captured images is generated. In one embodiment, depth information is obtained from a base image that is synthesized from the plurality of images.

Figure 7B:
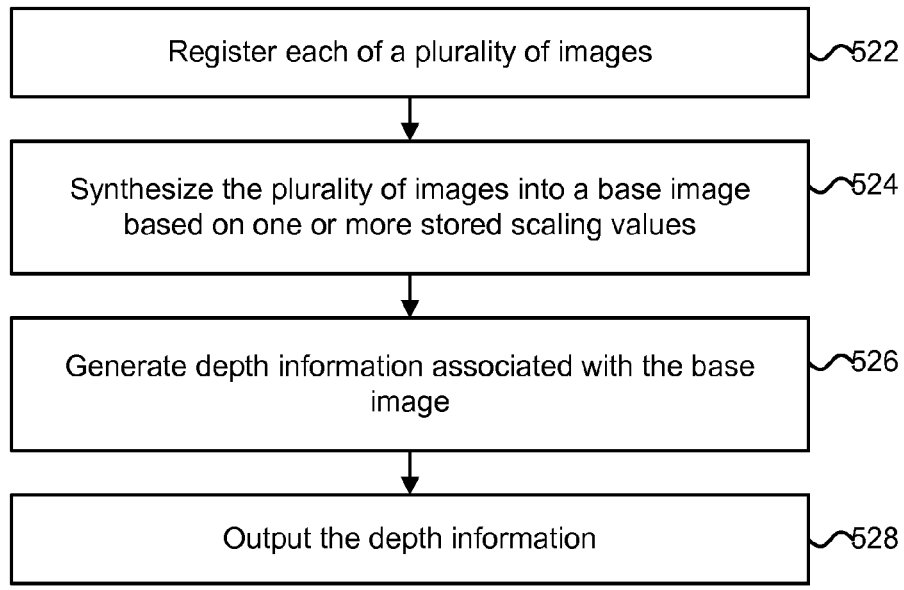
FIG. 7B is a flowchart describing one embodiment of a process for generating depth information from a plurality of images.

FIG. 7B is a flowchart describing one embodiment of a process for generating depth information from a plurality of images. The processes described in FIG. 7B is one example of a process for implementing step 516 in FIG. 7A. The process of FIG. 7B may be performed continuously and by one or more computing devices. Each step in the process of FIG. 7B may be performed by the same or different computing devices as those used in other steps, and each step need not necessarily be performed by a single computing device. In one embodiment, the process of FIG. 7B is performed by a target detection and tracking system, such as target detection and tracking system 10 in FIGS. 1-2.

In step 522, each of a plurality of images are registered or aligned to a common coordinate system. During image registration, a target detection and tracking system may register different images taken within a particular environment (e.g., images from slightly different points of view and/or taken at different points in time) into the common coordinate system associated with an environment.

In step 524, the plurality of images are synthesized into a base image based on the one or more scaling values stored in step 514 of FIG. 7A. In one embodiment, the base image is generated by applying high dynamic range imaging techniques to the plurality of images. High dynamic range imaging techniques may provide for a greater dynamic range of luminance between the lightest and darkest areas of an image as compared with traditional digital imaging techniques, thereby allowing details of an environment with a large contrast ratio to be preserved. High dynamic range images are typically created by capturing multiple images, often using exposure bracketing, and then merging them into a single high dynamic range image.

In some embodiments, saturated pixel locations in images closer to the target detection and tracking system are assigned scaled pixel values associated with one or more images farther away from the target detection and tracking system. In the case of two images being synthesized, the saturated pixel locations in the image associated with the higher light intensity are replaced with associated scaled pixel values from the image associated with the lower light intensity.

In step 526, depth information associated with the base image is generated. In some embodiments, image processing techniques that consider distortions in a structured light pattern and/or the spacing between portions of the structured light pattern may be used. In step 528, the depth information is outputted. In one example, the depth information is transmitted to a computing environment, such as computing environment 54 in FIG. 3.

Figure 7C:
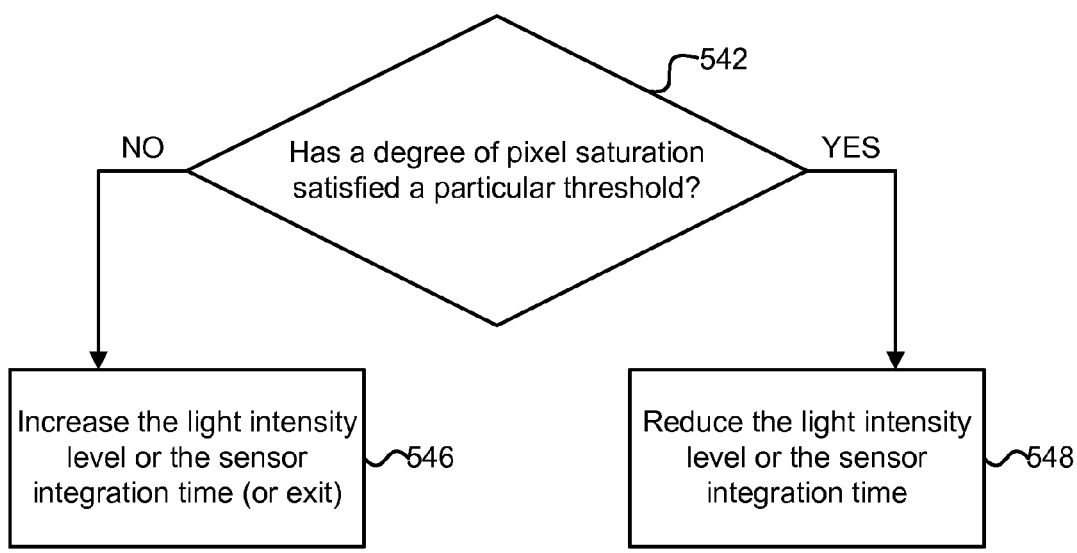
FIG. 7C is a flowchart describing one embodiment of a process for updating the light intensity level and sensor integration time.

FIG. 7C is a flowchart describing one embodiment of a process for updating the light intensity level and sensor integration time. The process described in FIG. 7C is one example of a process for implementing step 512 in FIG. 7A. The process of FIG. 7C may be performed continuously and by one or more computing devices. Each step in the process of FIG. 7C may be performed by the same or different computing devices as those used in other steps, and each step need not necessarily be performed by a single computing device. In one embodiment, the process of FIG. 7C is performed by a target detection and tracking system, such as target detection and tracking system 10 in FIGS. 1-2.

In step 542, it is determined whether a degree of pixel saturation has satisfied a particular threshold. If it is determined that the degree of pixel saturation has satisfied the particular threshold, then step 548 is performed. In step 548, the light intensity level or the sensor integration time is reduced. In one example, the light intensity level for a subsequent light pulse is reduced by a factor of two. In another example, the sensor integration time associated with a subsequent light pulse is reduced by a factor of four. If it is determined that the degree of pixel saturation has not satisfied the particular threshold, then step 546 is performed. In step 546, the light intensity level or the sensor integration time may be increased. In one example, the light intensity level is set to a level between the previous light intensity level and the maximum light intensity level (or initial light intensity level). In one embodiment, if the degree of pixel saturation is below the particular threshold, then no further light pulses or images may be captured.

Figure 8:
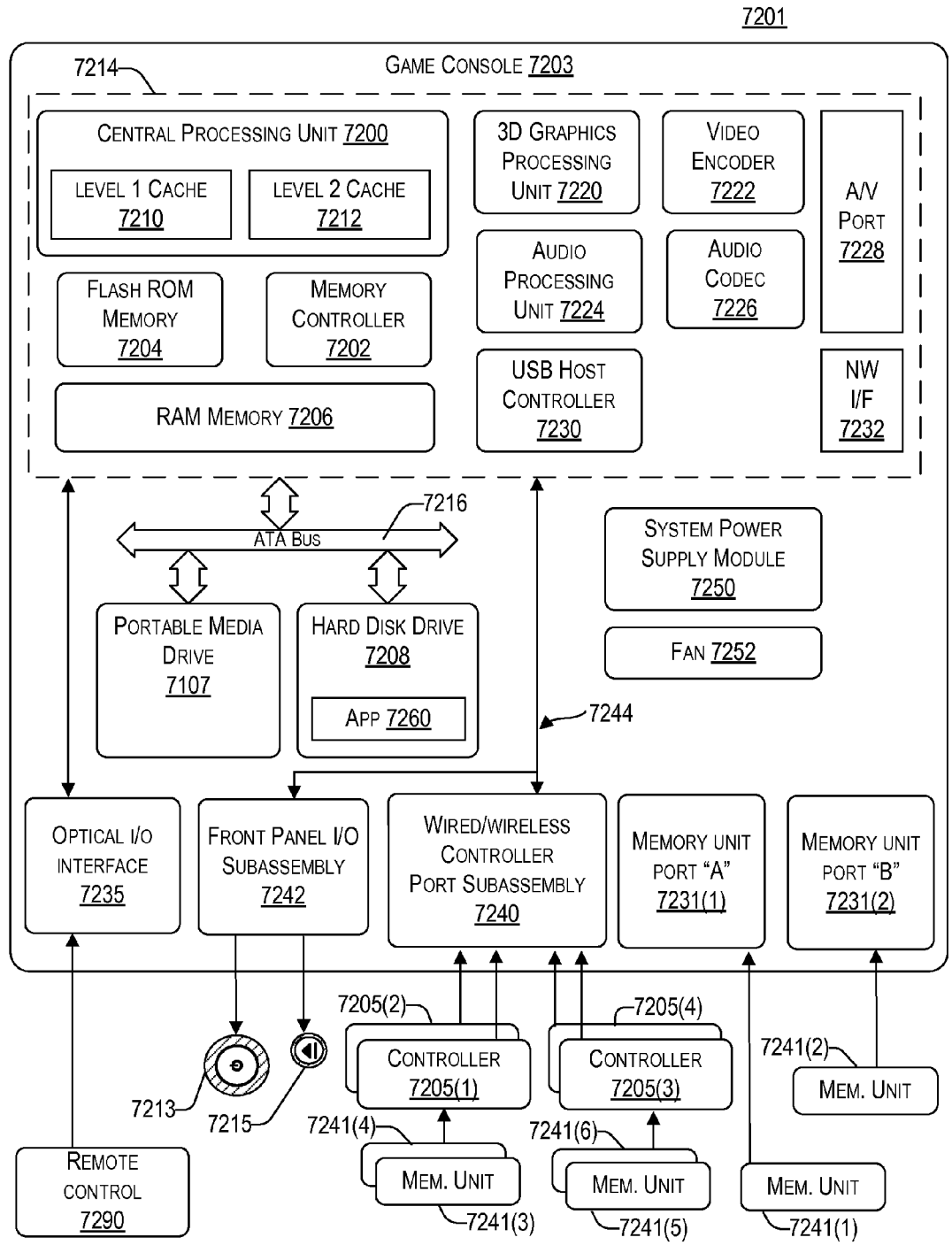
FIG. 8 is a block diagram of an embodiment of a gaming and media system.
Figure 9:
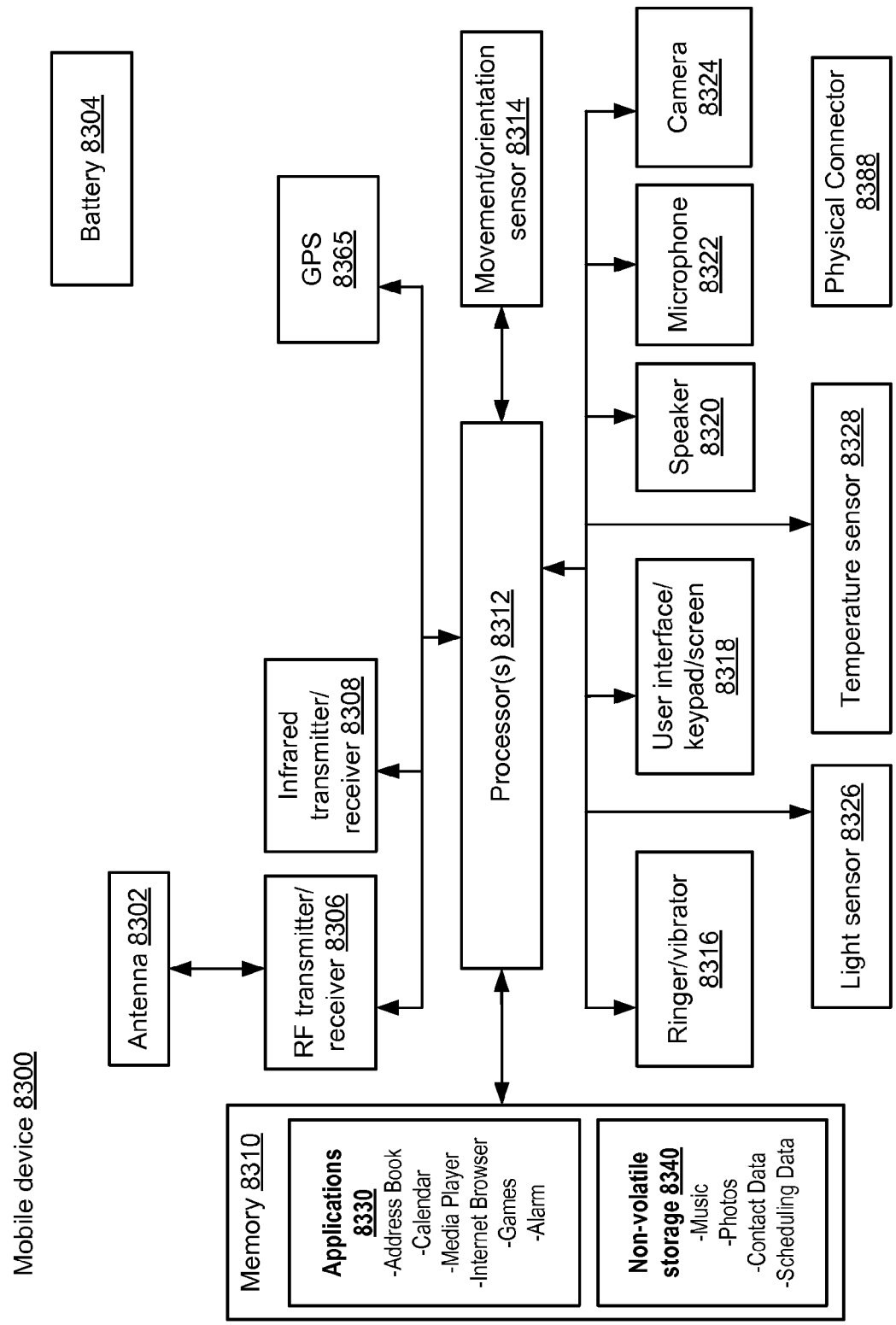
FIG. 9 is a block diagram of one embodiment of a mobile device.
Figure 10:
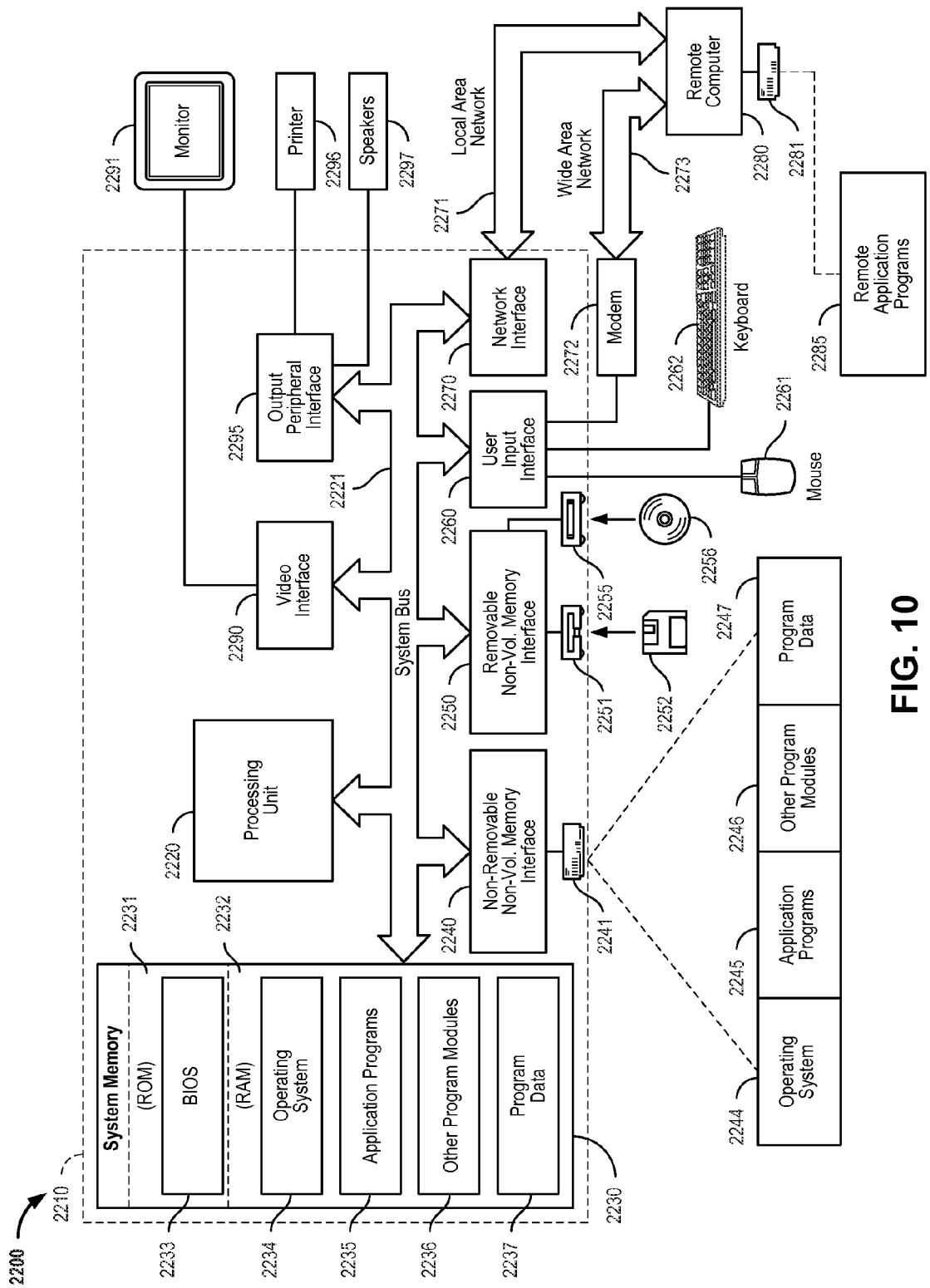
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201, which is one example of computing environment 12 in FIGS. 1-2. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an A/V (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300, which may be used to implement computing system 50 in FIG. 3. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computing environment 54 in FIG. 3. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a depth sensing camera, comprising:
projecting a light pattern at a first light intensity level into a first environment using an illumination source of the depth sensing camera;
capturing a first image of the first environment over a first sensor integration time using an image sensor of the depth sensing camera, the first image is associated with reflected light from the projection of the light pattern at the first light intensity level;
determining a degree of pixel saturation associated with the first image using one or more processors;
determining a capturing distance from the image sensor;
setting a second light intensity level different from the first light intensity level based on at least one of the degree of pixel saturation or the capturing distance from the image sensor;
projecting the light pattern at the second light intensity level into the first environment using the illumination source of the depth sensing camera;
capturing a second image of the first environment using the image sensor of the depth sensing camera, the second image is associated with reflected light from the projection of the light pattern at the second light intensity level;
synthesizing the first image and the second image into a combined image using the one or more processors;
determining a third light intensity level different from the second light intensity level based on a degree of pixel saturation associated with the second image;
projecting the light pattern at the third light intensity level into the first environment using the illumination source;
capturing a third image of the first environment over a third sensor integration time using the image sensor, the third image is associated with reflected light from the projection of the light pattern at the third light intensity level, the capturing the third image is performed subsequent to the capturing the second image, the capturing the second image is performed subsequent to the capturing the first image, the synthesizing the first image and the second image into the combined image includes synthesizing the third image into the combined image, the second light intensity level is less than the first light intensity level, the third light intensity level is greater than the second light intensity level; and
generating a depth map based on the combined image.

2. The method of claim 1, wherein:
the degree of pixel saturation comprises a percentage of pixels associated with the first image that are saturated; and
the setting a second light intensity level includes setting the second light intensity level to a lower intensity level than the first light intensity level if the percentage of pixels associated with the first image that are saturated is above a predetermined percentage.

3. The method of claim 1, wherein:
the setting a second light intensity level includes setting the second light intensity level to a higher intensity level than the first light intensity level if the degree of pixel saturation is not above a threshold.

4. The method of claim 1, wherein:
the synthesizing the first image and the second image into a combined image includes assigning to a pixel location in the combined image corresponding with a saturated pixel location in the first image a scaled pixel value associated with the second image.

5. The method of claim 1, wherein:
the third sensor integration time is substantially the same as the first sensor integration time.

6. The method of claim 1, wherein:
the projecting a light pattern at a first light intensity level into a first environment includes projecting the light pattern using a laser; and
the projecting a light pattern at a first light intensity level into a first environment occurs during a first period of time, the first sensor integration time is subsequent to the first period of time, the projecting a light pattern at a first light intensity level does not overlap in time with the first sensor integration time.

7. The method of claim 1, wherein:
the capturing a second image of the first environment comprises capturing the second image over a second sensor integration time, the second sensor integration time is less than the first sensor integration time.

8. The method of claim 1, wherein:
the determining a degree of pixel saturation includes determining a number of pixels that have been assigned a maximum light intensity setting;
the light pattern includes horizontal and vertical stripes; and
the second light intensity level is less than the first light intensity level.

9. An electronic device, comprising:
an illumination source, the illumination source to project a light pattern at a first light intensity level into a first environment;
a sensor, the sensor to capture a first image of the first environment over a first sensor integration time, the first image is associated with reflected light from the projection of the light pattern at the first light intensity level; and
one or more processors, the one or more processors to determine a degree of pixel saturation associated with the first image, the one or more processors to determine a capturing distance from the sensor, the one or more processors to determine a second light intensity level based on at least one of the degree of pixel saturation or the capturing distance from the sensor, the illumination source to project the light pattern at the second light intensity level into the first environment, the sensor to capture a second image of the first environment, the second image is associated with reflected light from the projection of the light pattern at the second light intensity level, the second light intensity level is different from the first light intensity level, the one or more processors to generate a combined image from the first image and the second image, the one or more processors to determine a third light intensity level different from the second light intensity level based on a degree of pixel saturation associated with the second image, the illumination source to project the light pattern at the third light intensity level into the first environment using the illumination source, the sensor to capture a third image of the first environment over a third sensor integration time using the image sensor, the third image is associated with reflected light from the projection of the light pattern at the third light intensity level, the second light intensity level is less than the first light intensity level, the third light intensity level is greater than the second light intensity level, the one or more processors to generate a depth map based on the combined image.

10. The electronic device of claim 9, wherein:
the degree of pixel saturation comprises a percentage of pixels associated with the first image that are saturated; and
the one or more processors to set the second light intensity level to a lower intensity level than the first light intensity level if the percentage of pixels associated with the first image that are saturated is above a particular percentage.

11. The electronic device of claim 9, wherein:
the one or more processors to set the second light intensity level to a higher intensity level than the first light intensity level if the degree of pixel saturation is not above a threshold.

12. The electronic device of claim 9, wherein:
the one or more processors to generate the combined image by assigning to a pixel location in the combined image corresponding with a saturated pixel location in the first image a scaled pixel value associated with the second image.

13. The electronic device of claim 9, wherein:
the third sensor integration time is substantially the same as the first sensor integration time.

14. The electronic device of claim 9, wherein:
the illumination source comprises a laser; and
the illumination source to project the light pattern during a first period of time, the first sensor integration time is subsequent to the first period of time.

15. The electronic device of claim 9, wherein:
the sensor to capture the second image over a second sensor integration time, the second sensor integration time is less than the first sensor integration time.

16. One or more storage devices containing processor readable code for programming one or more processors to perform a method comprising the steps of:
projecting a light pattern at a first light intensity level into a first environment using an illumination source, the projecting a light pattern at a first light intensity level into a first environment occurs during a first period of time;
capturing a first image of the first environment over a first sensor integration time using an image sensor, the first image is associated with the first light intensity level, the first sensor integration time is subsequent to the first period of time, the projecting a light pattern at a first light intensity level does not overlap in time with the first sensor integration time;
determining a degree of pixel saturation associated with the first image using one or more processors;
determining a capturing distance from the image sensor;
setting a second light intensity level based on at least one of the degree of pixel saturation or the capturing distance from the image sensor;
projecting the light pattern at the second light intensity level into the first environment using the illumination source;
capturing a second image of the first environment, the second image is associated with the second light intensity level, the second light intensity level is different from the first light intensity level;
synthesizing the first image and the second image into a combined image using the one or more processors; and
generating a depth map based on the combined image using the one or more processors.

17. The one or more storage devices of claim 16, wherein:
the projecting a light pattern at a first light intensity level into a first environment includes projecting the light pattern using a laser.

18. The one or more storage devices of claim 17, wherein:
the degree of pixel saturation comprises a percentage of pixels associated with the first image that are saturated; and
the setting a second light intensity level includes setting the second light intensity level to a lower intensity level than the first light intensity level if the percentage of pixels associated with the first image that are saturated is above a predetermined percentage.

19. The one or more storage devices of claim 17, wherein:
the setting a second light intensity level includes setting the second light intensity level to a higher intensity level than the first light intensity level if the degree of pixel saturation is not above a particular threshold.

20. The one or more storage devices of claim 19, wherein:
the synthesizing the first image and the second image into a combined image includes assigning to a pixel location in the combined image corresponding with a saturated pixel location in the first image a scaled pixel value associated with the second image.

\* \* \* \* \*